United States Patent
Nilsson

(10) Patent No.: US 9,626,489 B2
(45) Date of Patent: Apr. 18, 2017

(54) OBJECT RENDERING SYSTEMS AND METHODS

(71) Applicant: Intertrust Technologies Corporation, Sunnyvale, CA (US)

(72) Inventor: Jarl A. Nilsson, Mountain View, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 0 days.

(21) Appl. No.: 14/210,360

(22) Filed: Mar. 13, 2014

(65) Prior Publication Data

US 2014/0283104 A1    Sep. 18, 2014

Related U.S. Application Data

(60) Provisional application No. 61/779,665, filed on Mar. 13, 2013, provisional application No. 61/919,441, filed on Dec. 20, 2013.

(51) Int. Cl.
| | |
|---|---|
| G06F 21/00 | (2013.01) |
| G06F 21/10 | (2013.01) |
| G06Q 50/18 | (2012.01) |
| B29C 67/00 | (2017.01) |

(52) U.S. Cl.
CPC ........... *G06F 21/10* (2013.01); *G06Q 50/184* (2013.01); *B29C 67/0088* (2013.01)

(58) Field of Classification Search
USPC ........................................................ 726/26
See application file for complete search history.

(56) References Cited

U.S. PATENT DOCUMENTS

| | | | |
|---|---|---|---|
| 5,892,900 A | 4/1999 | Ginter et al. | |
| 5,920,861 A | 7/1999 | Hall et al. | |
| 5,943,422 A | 8/1999 | Van Wie et al. | |
| 5,982,891 A | 11/1999 | Ginter et al. | |
| 6,157,721 A | 12/2000 | Shear et al. | |
| 6,185,683 B1 | 2/2001 | Ginter et al. | |
| 6,658,568 B1 | 12/2003 | Ginter et al. | |
| 7,188,103 B2 * | 3/2007 | Furuhashi | G06F 17/30247 |
| 7,576,842 B2 * | 8/2009 | Park | G06K 9/00577 |
| | | | 356/335 |
| 8,234,387 B2 | 7/2012 | Bradley et al. | |

(Continued)

OTHER PUBLICATIONS

Weinberg, M.; "What's the Deal with Copyright and 3D Printing"; Institute for Emerging Innovation; 2013; 23 pages.

(Continued)

*Primary Examiner* — Mahfuzur Rahman
(74) *Attorney, Agent, or Firm* — Finnegan, Henderson, Farabow, Garrett & Dunner LLP

(57) ABSTRACT

Systems and methods are described that protect intellectual property rights in connection with 3-dimensional printing processes. In certain embodiments, an object a user would like to render with a 3-dimensional printing device may be compared with one or more managed objects having certain associated intellectual property rights. If the object is found to be similar to a managed object (e.g., similar in shape, function, composition, etc.), policy associated with the managed object may be enforced in connection with rendering the object. In this manner, intellectual property rights associated with the managed objects may be enforced.

14 Claims, 5 Drawing Sheets

(56) References Cited

U.S. PATENT DOCUMENTS

| | | |
|---|---|---|
| 8,970,867 B2* | 3/2015 | Baldwin et al. ............. 358/1.14 |
| 2006/0277122 A1 | 12/2006 | Shear et al. |
| 2007/0110320 A1* | 5/2007 | Choi .................. G06K 9/00208 |
| | | 382/203 |
| 2007/0180519 A1 | 8/2007 | Boccon-Gibod et al. |
| 2009/0164379 A1* | 6/2009 | Jung et al. ...................... 705/59 |
| 2009/0165126 A1* | 6/2009 | Jung et al. ...................... 726/21 |
| 2009/0165127 A1* | 6/2009 | Jung et al. ...................... 726/21 |
| 2010/0031351 A1* | 2/2010 | Jung et al. ...................... 726/21 |
| 2010/0031374 A1* | 2/2010 | Jung et al. ...................... 726/30 |
| 2013/0235412 A1* | 9/2013 | Baldwin et al. ............. 358/1.14 |
| 2014/0184496 A1* | 7/2014 | Gribetz ................ G02B 27/017 |
| | | 345/156 |
| 2014/0223583 A1 | 8/2014 | Wegner et al. |
| 2015/0026785 A1* | 1/2015 | Soon-Shiong ................... 726/7 |

OTHER PUBLICATIONS

Weinberg, M.; "It Will Be Awesome if They Don't Screw It Up"; Public Knowledge; Nov. 2010; 17 pages.

* cited by examiner

OBJECT RENDERING SYSTEMS AND METHODS

RELATED APPLICATIONS

This application claims the benefit of priority under 35 U.S.C. §119(e) to U.S. Provisional Patent Application No. 61/779,665, filed Mar. 13, 2013, and entitled "OBJECT RENDERING SYSTEMS AND METHODS", and to U.S. Provisional Patent Application No. 61/919,441, filed Dec. 20, 2013, and entitled "OBJECT RENDERING SYSTEMS AND METHODS", both of which are hereby incorporated by reference in their entireties.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND & SUMMARY

The development and expansion of 3-dimensional ("3D") printing technology offers many benefits. For example, using a 3D printer, a consumer may print a replacement for a machine part in minutes rather than order the part from a distant manufacturer's warehouse and wait for it to be shipped to the consumer's home. In certain instances, rendering an item with a 3D printer may even take less time than traveling to a local store and purchasing an in-stock item. 3D printing technology may be utilized in connection with a variety of applications including, without limitation, biomechanical applications (e.g., construction of human or animal organs or tissue from 3D printed scaffolding), printing of manufacturing items such as specialized chemical or biochemical reactors, distributed manufacturing, architectural prototyping, industrial and engineering design, various hobbyist activities, and/or the like.

While 3D printing technology offers a variety of benefits, it also introduces a variety of potential issues. For example, an individual may use 3D printing technology to produce a firearm, a firearm mold, an object that could be used to make a firearm, and/or components thereof and/or tools to produce the same without the usual governmental checks and/or controls that manufacturing and/or acquiring a firearm entails. A variety of other dangerous, illegal, and/or otherwise controlled items or substances and/or tools to produce the same may be similarly manufactured without conforming to applicable laws and/or policies.

Less sinister, but troubling from an economic perspective, is the potential for 3D printing technology to be used in connection with rendering protected or proprietary (e.g., patented, copyrighted, trademarked, etc.) items. For example, an item having an ornamental design protected by a design patent may be easily rendered using a 3D printer by an individual without rights to the design. 3D printing technology may allow protected designs to be infringed and/or distributed without authorization from rights holders similar to the manner in which unlicensed digital music and/or movies may be distributed through file-sharing networks. Infringement and/or unauthorized distribution of designs may allow for objects to be copied for a cost far below an amount needed by a rights holder to recoup and/or otherwise profit from their development cost.

Current intellectual property laws and protection mechanisms may be relatively effective in enforcing and/or preventing individual sources of intellectual property theft. Such laws and protection mechanisms, however, may be less effective in enforcing and/or preventing distributed or multiple sources of intellectual property theft, as may be the case with individuals utilizing 3D printing technology to produce items that infringe protected or proprietary designs.

Systems and methods disclosed herein facilitate protection, governance, management and/or enforcement of intellectual property rights in connection with 3D printing technology. In certain embodiments, the disclosed systems and methods may utilize descriptions of managed objects (e.g., objects associated with patented or copyrighted designs or the like) to identify attempts to render managed objects and/or objects similar to managed objects using a 3D printing device. As used herein, a managed object may include any object, item, substance, product, and/or the like, that may be rendered by a 3D printing device.

In certain embodiments, prior to rendering an object, a control system associated with a 3D printing device may determine whether the object is the same and/or similar to a known managed object. To determine whether the object is the same and/or similar to a known managed object, the control system and/or a related system may compare information associated with the object with information describing various known managed objects. In certain embodiments, such a comparison may include comparing and/or otherwise analyzing an objects shape, material, composition, function, and/or the like relative to a known managed object. A variety of techniques may be utilized to compare objects with known managed objects in connection with the disclosed embodiments including, without limitation, 3D pixel iterative refinement and/or 3D fractal refinement. The terms iterative or iteratively are used herein to refer broadly to stepwise or repeated processes, and not in a strict mathematical sense.

If it is determined that an object is not the same or sufficiently similar to a known managed object, the control system may allow the 3D printing device to proceed with rendering the object. If it is determined that an object is the same or sufficiently similar to a known managed object, the control system may identify and enforce one or more articulated policies associated with the known managed object. In certain embodiments, such a policy may prevent rendering of the object by the 3D printing device. In further embodiments, a policy may articulate that certain conditions be met prior to allowing rendering of an object (e.g., purchasing rights associated with a managed object, registration with a rights holder, demonstrating authorization to render a managed object, etc.). In yet further embodiments, a policy may articulate that certain actions be performed in connection with rendering an object (e.g., notifying a rights holder, law enforcement, and/or governmental authorities, etc.). It will be appreciated that a variety of other types of policies may be articulated, and that any type of policy may be utilized in connection with the disclosed embodiments.

By ensuring that objects that are the same and/or similar to known managed objects are identified in connection with object rendering activities, unauthorized production of the managed objects using 3D printing technology may be mitigated. Moreover, by preventing the unauthorized rendering of certain dangerous, illegal, and/or otherwise controlled objects or substances and enabling notifications to be sent to authorities of attempts to render such objects or substances, the production and/or distribution of controlled objects and substances may be reduced.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
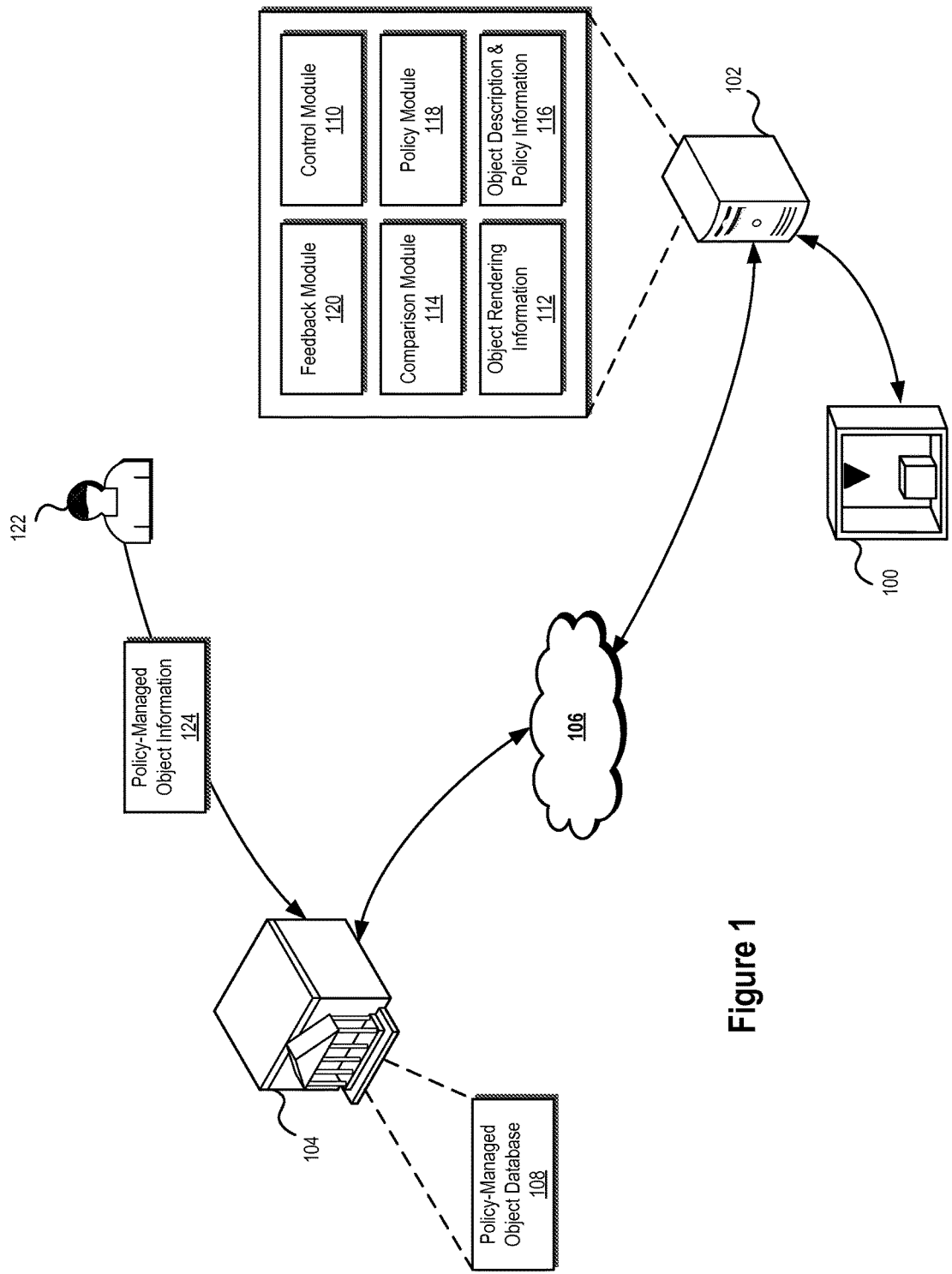
FIG. 1 illustrates a system for enforcing intellectual property rights in connection with a 3D printing device consistent with embodiments of the present disclosure.

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Embodiments disclosed herein allow for management and/or enforcement of intellectual property rights and/or other controls associated with managed objects. In some embodiments, a managed object may comprise any object, item, substance, product, and/or the like protected and/or otherwise associated with certain intellectual property rights. For example, a managed object may include an ornamental design protected by a design patent, a configuration protected by a utility patent, a component that is trademarked, an aspect that is copyrighted, and/or the like. In further embodiments, a managed object may comprise any object, item, substance, product, and/or the like subject to one or more control paradigms (e.g., by a governmental authority or the like). For example, the production, manufacture, and/or acquisition of a firearm or components thereof, regardless of whether their particular design is protected by intellectual property rights, may be controlled and/or otherwise limited by a governmental authority. A variety of other controlled items may be managed objects consistent with embodiments disclosed herein including, without limitation, certain chemical mixtures and/or devices, weapons (e.g., bombs, knives, etc.), devices subject to inspection regulations (e.g., safety devices, medical devices, etc.), drugs and/or associated paraphernalia, and/or any other object, item, substance, or product subject to one or more controls by associated parties.

In certain embodiments, the systems and methods described herein can, for example, be used in connection with digital rights management ("DRM") technologies such as those described in commonly assigned, co-pending U.S. patent application Ser. No. 11/583,693 ("the '693 application") and/or the service orchestration technologies such as those described in commonly assigned co-pending U.S. patent application Ser. No. 10/863,551 ("the '551 application), as well as in other contexts. It will be appreciated that these systems and methods are novel, as are many of the components, systems, and methods employed therein.

3D Printing Rights Enforcement Architecture

FIG. 1 illustrates a system for enforcing intellectual property rights in connection with a 3D printing device 100 consistent with embodiments of the present disclosure. The 3D printing device 100 may comprise any type of 3D printing device including, without limitation, extrusion, wire, granular, power bed and inkjet head, laminated, and/or light polymerized-based 3D printing devices. In certain embodiments, the 3D printing device may implement fused deposition modeling ("FDM"), electron beam freeform fabrication ("EBF$^3$"), direct metal laser sintering ("DMLS"), electron-beam melting ("EBM"), selective laser melting ("SLM"), selective heat sintering ("SHS"), selective laser sintering ("SLS"), plaster-based 3D printing, laminated object manufacturing ("LOM"), stereolithography ("SLA"), digital light processing ("DLP"), and/or any other technology that may be utilized in connection with 3D printing processes. In certain embodiments, the 3D printing device 100 may be configured to render objects using a variety of materials including, without limitation, plastic, metal, ceramics, and/or any combination thereof.

The 3D printing device 100 may include a variety of mechanical components and/or modules configured to render 3D objects. In certain embodiments, the 3D printing device 100 may include one or more heads configured to perform various functions in connection with rendering a 3D object. The heads may work in concert, independently, simultaneously, or in sequence as part of the 3D object rendering process. A position and action of the heads may be controlled by one or more actuators.

In certain embodiments, the 3D printing device 100 may include a printing head. The printing head may be configured to add material to a substrate, an existing object, and/or an object being rendered. In certain embodiments, such material may be deposited by the printing head in relatively small amounts that build into a larger object as the rendering process progresses. Certain printing heads may extrude material from an aperture and deposit the material onto a substrate or a previously deposited layer of material. In some embodiments, the printing head and/or a separate annealing head may implement an annealing process to harden deposited material in connection with an object rendering process. Among other things, the annealing head may change the physical and/or mechanical properties of deposited material (e.g., by applying heat or cold to a deposited material and/or to parts of a rendered object, etc.).

In some embodiments, the printing head may deposit one or more elements or compounds to attenuate the physical properties of an object being rendered. For example, a composite material may be formed from a variety of deposited materials and/or compounds, thereby providing a rendered object with certain enhanced characteristics. Such characteristics may include, without limitation, increased tensile strength, resistance to cracking or breaking, self-healing, flame retardence, fragrance, optical properties, conductance properties, electromagnetic waveguide properties, mechanical vibration properties, hardness, and/or the like. An example of an object rendered using a plurality of materials to enhance its physical properties may include a bicycle frame, an airplane wing, an air foil, and/or a car body, where the object may be rendered with bonding material layers and strengthening material at its core (e.g., carbon fiber), with a sub-surface comprising metal forming electromagnetic wave guides that direct and absorb electromagnetic radiation, followed by a surface that absorbs optical light in a prescribed manner (e.g., providing coloration, embedded logos, light absorption, electromagnetic reflecting, etc.). In some embodiments, some surfaces (e.g., such as airplane wings or auto bodies) can be rendered with dimples or protrusions that affect the airflow to improve qualities such as fuel economy or navigability.

The 3D printing device 100 may further including an inclusion head. Material may be moved by the 3D printing device 100 from one position to another by one or more actuators. In certain embodiments, material and/or other objects may be added and/or embedded into a rendered object using the inclusion head. Such material and/or other objects may include previously constructed objects (e.g., constructed using different materials) and/or objects manufactured by third parties. For example, in manufacturing a cutting tool, the design may call for a cutting surface made from diamond. The inclusion head may provide for the inclusion of a third party manufactured cutting surface. In further embodiments, the inclusion head may provide a variety of other functions including, without limitation, providing an electromagnetic field during deposition of material, an acoustic field to perturb deposited material, and/or the like.

In some embodiments, the 3D printing device 100 may include a chemical deposition head. Among other functions, the chemical deposition head may be configured to deposit and/or otherwise apply chemicals to an object during a rendering process, thereby modifying physical and/or mechanical properties of material deposited by the printing head. In further embodiments, the chemical deposition head may be used to deposit precursor chemicals to a printed chemical manufacturing tool.

Certain rendered objects may include biological materials. For example, certain medical testing devices and/or lab-on-a-chip devices may include deposited biological materials. In some embodiments, biological materials (e.g., partly or full dead, live, and/or immobilized cells and/or chemical reagents) may be deposited on a rendered object using a bio-material deposition head of the 3D printing device 100.

Operation of the 3D printing device 100 may be controlled by a control system 102. The control system 102 may be communicatively coupled to one or more other systems via network 106. For example, the control system 102 may communicate with a trusted authority 104 maintaining a managed object database 108 and associated policies used in connection with the disclosed embodiments. Although illustrated as separate systems, it will be appreciated that in other embodiments, certain functions of the 3D printing device 100, the control system 102, and/or the trusted authority 104 may be performed by a single system and/or any suitable combination of systems.

The control system 102, trusted authority 104, and/or one or more other associated systems (not shown) may comprise any suitable computing system or combination of systems configured to implement embodiments of the systems and methods disclosed herein. In certain embodiments, the control system 102, trusted authority 104, and/or other associated systems may comprise at least one processor system configured to execute instructions stored on an associated non-transitory computer-readable storage medium. As discussed in more detail below, the control system 102, trusted authority 104, and/or other associated systems may further comprise a secure processing unit ("SPU") configured to perform sensitive operations such as trusted credential and/or key management, secure policy management and enforcement, and/or other aspects of the systems and methods disclosed herein. The control system 102, trusted authority 104, and/or other associated systems may further comprise software and/or hardware configured to enable electronic communication of information between the systems 102, 104 via one or more associated network connections (e.g., network 106).

The control system 102 may comprise a computing device executing one or more applications configured to implement embodiments of the systems and methods disclosed herein. In certain embodiments, the control system 102 may comprise a laptop computer system, a desktop computer system, a smartphone (e.g., the Apple® iPhone™, the Motorola® Droid®, and the BlackBerry® Storm™), a tablet computer (e.g., the Apple® iPad™, the HP® Slate, and the Samsung® Galaxy™ Tablet), and/or any other computing system and/or device that may be utilized in connection with the disclosed systems and methods. In some embodiments, the control system 102 may be communicatively coupled to the 3D printing device 100 and be configured to control the operation thereof. In further embodiments, the control system 102 and the 3D printing device 100 may be integrated into a single system. In certain embodiments, the control system 102 may comprise software and/or hardware configured to, among other things, control object rendering by the 3D printing device 100, identify attempts to render managed objects using the 3D printing device 100, and/or enforce associated policies in connection with the same.

The control system 102 may communicate with the trusted authority 104 and/or other systems via a network 106 comprising any suitable number of networks and/or network connections. The network connections may comprise a variety of network communication devices and/or channels and may utilize any suitable communication protocols and/or standards facilitating communication between the connected devices and systems. The network connections may comprise the Internet, a local area network, a virtual private network, and/or any other communication network utilizing one or more electronic communication technologies and/or standards (e.g., Ethernet or the like). In some embodiments, the network connections may comprise a wireless carrier system such as a personal communications system ("PCS"), and/or any other suitable communication system incorporating any suitable communication standards and/or protocols. In further embodiments, the network connections may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network connections may incorporate one or more satellite communication links. In yet further embodiments, the network connections may utilize IEEE's 802.11 standards, Bluetooth®, ultra-wide band ("UWB"), Zigbee®, and or any other suitable communication protocol(s).

Object Rendering Control

Operation of the 3D printing device 100 may be controlled, at least in part, by a control module 110 executing on the control system 102. Among other things, the control module 110 may issue one or more instructions to the 3D printing device 100 (e.g., head actuation instructions or the like) in connection with rendering an object. For example, the control module 110 may issue instructions for how to apply and/or actuate various heads of the 3D printing device 100, instructions regarding what materials should be utilized in connection with the various heads, and/or any other instructions implementing process steps for rendering an object with the 3D printing device 100.

The instructions for rendering an object may be based on object rendering information 112 stored by the control system 102. In certain embodiments, the object rendering information 112 may comprise a description of an object to be rendered. For example, the object rendering information 112 may comprise a physical description of an object to be rendered. In some embodiments, the physical description of an object included in the object rendering information 112 may comprise a description of the object at varying degrees of resolution and/or granularity. For example, a macro description, a micro description, and/or an intermediate resolution description of the object may be included in the object rendering information 112.

In some embodiments, the object rendering information 112 may comprise the instructions to be implemented by the 3D printing device 100 in connection with rendering an object. In yet further embodiments, the control module 110 may analyze the description of an object to be rendered included in the object rendering information 112 and generate instructions for rendering the object based on the capabilities of the 3D printing device 100. That is, the control module 110 may determine how to render the object with the 3D printing device 100 based on the physical description of the object included in the object rendering information 112 (e.g., without the aid of pre-existing instructions included the object rendering information 112).

Object rendering information 112 may be provided to the control system 102 in a variety of ways. For example, in some embodiments, a user of the control system 102 and/or the 3D printing device 100 may provide the object rendering information 112 to the control system 102 via a computer-readable storage medium or the like (e.g., a USB drive or other physical media). In other embodiments, the object rendering information 112 can be downloaded from another system. For example, a third-party service provider may offer a variety of object designs for download and/or purchase. A user of the control system 102 and/or the 3D printing device 100 may select a desired object from the service and receive associated object rendering information 112 for use by the control system 102 and/or the 3D printing device 100. In yet further embodiments, object rendering information 112 may be created by a user of the control system 102 and/or the 3D printing device 100 using, at least in part, a software application for designing objects (e.g., 3D modeling and/or design software and/or the like).

A feedback module 120 executing on the control system 102 may receive information from the 3D printing device 100 and/or generate information based on feedback signals received from the 3D printing device 100 regarding a status of the device 100 and/or an object being rendered by the device 100. In further embodiments, the feedback module 120 may receive and/or generate information regarding various environmental parameters relating to the 3D printing device 100 and/or an object being rendered by the same. In certain embodiments, such information may be utilized by the control system 102 (e.g., the control module 110) and/or the 3D printing device 100 in connection with adjusting parameters and/or other control instructions used in rendering an associated object.

In certain embodiments, the feedback module 120 may perform physical measurements related to a rendered and/or an object being rendered. Such measurements may be utilized by the control system 102 and/or the 3D printing device 100 to adjusted instructions for rendering the object so that the actual rendered object reflects a description of the object included in the object rendering information 112.

Registration of Managed Objects

In certain embodiments, a rights holder 122 owning rights to a managed object, a governmental authority (e.g., law enforcement) or other authority implementing controls and/or checks relating to a managed object, and/or any other party may provide policy-managed object information 124 to the trusted authority 104. In certain embodiments, the policy-managed object information 124 may be provided to the trusted authority 104 as part of a registration process of an associated managed object. The policy-managed object information 124 may comprise a physical description of an associated managed object (e.g., a description at vary degrees of resolution and/or granularity). In some embodiments, the physical description may comprise a description of a structure of the managed object, a material composition of the managed object, and/or any physical property of the managed object. The policy-managed object information 124 may further comprise instructions to be implemented by a 3D printing device 100 in connection with rendering an associated managed object.

In some embodiments, the policy-managed object information 124 may comprise policy information associated with a managed object. The policy information may articulate certain restrictions, conditions, requirements, and/or other actions associated with the rendering the managed object with a 3D printing device 100. Policy information may articulate, without limitation, policies preventing and/or otherwise restricting the rendering of a managed object, policies articulating that certain conditions be met prior to rendering of a managed object (e.g., purchasing rights associated with the managed object, registration with a rights holder, demonstrating authorization to render the managed object, etc.), policies articulating that certain actions be performed in connection with rendering an object (e.g., notifying a rights holder, law enforcement, and/or governmental authorities, etc.), and/or the like. It will be appreciated that a variety of other types of policies may be associated with a managed object, and that any type of policy articulating any restrictions, conditions, requirements, and/or actions to be enforced in connection with rendering the managed object may be utilized in connection with the disclosed embodiments.

Policy-managed object information 124 provided to the trusted authority 104 may be stored, managed, and/or maintained by the trusted authority 104 in a managed object database 108. The managed object database 108 may store policy-managed object information (e.g., object descriptions, policies, etc.) associated with a plurality of managed objects. In certain embodiments, the object information included in the managed object database 108 may include information provided by a plurality of rights holders 122, governmental authorities, and/or other authorizes implementing managed object controls and/or checks. In this manner, the trusted authority 104 and/or managed object database 108 may operate as a centralized repository storing information relating to a variety of managed objects. As discussed in more detail below, certain contents of the managed object database 108 may be distributed to control systems 102 associated with 3D printing devices 102 for use in connection with the disclosed systems and methods.

Object Comparison Overview

Before rendering an object described by the object rendering information 112 with the 3D printing device 100, the control system 102 may determine whether the object is the same and/or similar to a known managed object. To determine whether the object is the same and/or similar to a known managed object, the control system 102 and/or a comparison module 114 executing thereon may compare the object rendering information 112 with managed object description information 116 describing various known managed objects. In certain embodiments, the object description information 116 may be provided to the control system 102 from the trusted authority 104 (e.g., from information included in the policy-managed object database 108 maintained by the trusted authority 104). Managed object description information 116 may be provided to the control system 102 in response to a request to render an object, as an automatic periodic update, and/or by any other suitable mechanism.

Although embodiments described herein may utilize a comparison module 114 executing on the control system 102 to compare object rendering information with object description information 116, in other embodiments such a comparison may be performed by the trusted authority 104 and/or one or more other remote systems. For example, in some embodiments, the object rendering information 112 may be communicated to the trusted authority 104 and/or other remote system from the control system 102 in response to a request to render an object. In such embodiments, the trusted authority 104 and/or other remote system may compare the received object rendering information 112 with object description information included in the policy-managed object database 108 maintained by the trusted authority 104.

A variety of features of an object reflected in object rendering information 112 may be compared with features of known managed objects reflected in the managed object description information 116 to determine whether the object is the same and/or similar to a known managed object. For example, a comparison of whether the object has a same or similar shape to a known managed object, utilizes the same or similar materials as a known managed object, has a same or similar function as a known managed object, is rendered using the same or similar manufacturing steps, and/or the like may be performed to determine a similarity between an object and a known managed object. In certain embodiments, such a comparison may utilize a library of shapes and/or manufacturing methods that may be included in managed object description information 116. Such a library may be remote (e.g., maintained by a trusted authority 104), local to the control system 102, and/or distributed between multiple systems. In certain embodiments, a plurality of libraries and/or repositories of managed object description information 116 and/or policy-managed object database information 108 may be utilized.

Object Shape Comparison

A variety of techniques may be utilized to compare the shape of objects with known managed objects in connection with the disclosed embodiments. In certain embodiments, such a comparison may produce a set of potentially similar managed objects and/or an indication of a degree of similarity between an object to be rendered and known managed objects. Certain embodiments of the shape comparison methods disclosed herein may account for differences in scale and/or rotation between an object to be rendered and known managed objects. Moreover, embodiments of the shape comparison methods may be performed with varying speed and/or memory requirements based on object complexity and execution environment capabilities.

Object Shape Comparison—3D Pixel Refinement

In some embodiments, a shape of an object may be compared with known managed objects using iterative 3D pixel refinement techniques. This method may rely, at least in part, on inscribing an object in a modeled cube. The cube may then be subdivided into a plurality of sub-cubes. In certain embodiments, $2^3$ or $3^3$ sub-cubes may be utilized, although other subdivision types may also be used. The sub-cubes may be evaluated to see if the object intersects any of the sub-cubes, thereby creating a pixelated cube of $n^3$ sub-cubes.

If a pixelated representation of the object and a known managed object are the same or similar to a certain degree (e.g., corresponding sub-cubes for the object and the known managed object indicate intersection and/or no intersection with the object by addresses associated with intersection points), an evaluation may be performed as to whether the level of sub-cube divisions is of sufficient resolution to determine object similarity. If the resolution of the sub-cube divisions is sufficient to determine whether the object and the known managed object are similar, an indication of the objects being similar may be issued by the comparison module 114, and appropriate policy enforcement actions may be taken. If not, further comparison may be performed at a more granular sub-cube resolution. That is, if the objects are found to be similar at a particular resolution but not at a desired resolution, each sub-cube may be further subdivided and a comparison may be again performed at the more granular sub-cube resolution. In this manner, the pixel refinement process may be iterative until it is determined with sufficient confidence that an object and a known managed object are the same or similar to a particular degree.

In certain embodiments, if pixelated representations of the object and a known managed object are different, the object may be rotated in the cube model so that intersection of the object and the sub-cubes may change to a different configuration. Such rotation may be performed iteratively in connection with the pixel refinement process detailed above. In this manner, shape comparison methods consistent with the disclosed embodiments may account for differences in scale and/or rotation between an object to be rendered and known managed objects.

Object Shape Comparison—3D Fractal Refinement

In further embodiments, a shape of an object may be compared with known managed objects using iterative 3D fractal refinement techniques. In certain embodiments, this method may rely, at least in part, on mathematical fractal constructs. Particularly, a fractal curve that fills space with some geometric object, a line, a sphere, or the like may be chosen as a shape measure. The fractal may be overlaid on an object to be rendered to measure it and be scaled to so as to fit the object within the fractal.

Segments of the fractal curve may be associated with a number associated with an address of the segment. For example, in a line-segmented fractal, each fractal generation may be labeled with increasing (e.g., consecutively increasing) numbers. In an exemplary fractal having 10 line segments per generation, segments in the first generation may be numbered from 0 to 9, segments in the second generation may be numbered from 10 to 19, and so on. In this manner, any segment in the linear fractal curve may be addressed with an integer from 0 to some sufficiently large number. In this example, the line segment may represent a spatial address where the generation of the address represents a precision of the measurement.

An object to be rendered may be analyzed so that each intersection between the object's surface and the fractal is noted to a particular precision (e.g., a sufficient precision to determine whether the object and one or more known objects are the same and/or similar). This process may yield a series of integers (e.g., addresses) that describe the object sorted by any suitable method.

In certain embodiments, when an object to be rendered is compared with known managed objects, the series may be normalized in some manner (e.g., numeric order). A series of an object to be rendered may be compared with a series of a known managed object. The differences between the two series may be indicative of a difference between the objects. Such a difference may be analyzed to see if the object to be rendered and the known managed object are the same or similar to a degree that appropriate policy enforcement actions should be applied.

Object Shape Comparison—Addressing

As discussed above, addressing may be performed using an inclusion of a volume techniques (e.g., 3D pixel iterative refinement) and/or intersection between a curve and a line techniques (e.g., 3D fractal refinement). It will be appreciated that a variety of other types of object shape addressing techniques may be utilized in connection with the embodiments disclosed herein, and that any type of shape addressing techniques may be utilized in connection with the shape comparison and/or other methods disclosed herein. For example, in some embodiments, techniques for addressing points on an object surface measured using Cartesian and/or polar coordinates may be used. In certain embodiments, addressing techniques utilized in connection with the disclosed embodiments may enable efficient and effective shape comparison processes.

Object Properties & Function Comparison

In some embodiments, the comparison module 114 may perform a comparison of whether an object to be rendered has the same or similar properties and/or function as a known managed object to determine a similarity between the object and the managed object. In certain embodiments, the function of an object may be based, at least in part, on the material used to render the object. As an illustration, an object having a shape of a firearm may be similar in shape to a policy-managed firearm object, but based on its intended rendering material composition have a different function. For example, if the object's rendering material is a brittle plastic, despite its similar shape to a policy-managed firearm object, the object may be unusable as a firearm and therefore may have a different function than the policy-managed firearm object. In such an instance, the comparison module 114 may determine that the firearm object and the policy-managed firearm object are not similar and policy associated with the managed object would not be enforced. If, however, the object's rendering material were annealed steel, the object may be capable of a similar function to the policy-managed firearm object. In this circumstance, the comparison module 114 may determine that the object and the policy-managed firearm object are the same or similar, and policy associated with the managed object may be enforced by the control system 102 (e.g., preventing rendering of the object or the like).

In another example, a color or other physical property of an object may be compared with a known managed object. For example, a certain color on a shoe sole associated with a known managed object may be trademarked or otherwise protected. In connection with rendering an object corresponding to a shoe, the comparison module 114 may determine whether the sole of the shoe object has the same protected color of the sole of the shoe associated with the known managed object. If the color is different, the comparison module 114 may determine that the object to be rendered and the known managed object are not the same or similar, and certain policy associated with the managed object would not be enforced. If, however, the comparison module 114 determines that the color is the same and/or similar within a particular degree, the comparison module 114 may determine that the object to be rendered and the known managed object are the same or similar, and certain policy associated with the managed object may be enforced (e.g., preventing rendering of the object or the like).

Object Manufacturing Comparison

In some embodiments, the comparison module 114 may perform a comparison of whether an object to be rendered has the same or similar associated rendering and/or manufacturing steps as a known managed object to determine a similarity between the object and the managed object. In certain embodiments, such a comparison may allow certain protected and/or otherwise proprietary methods (e.g., patented methods or the like) to be protected in connection with the disclosed embodiments.

Object Compositional Comparison

The comparison module 114 may further perform a comparison whether materials included in an object to be rendered are the same or similar as materials included in a known managed object to determine a similarity between the object and the managed objects. In certain embodiments, such a comparison may allow material composition (e.g., patented or otherwise proprietary materials) to be protected in connection with the disclosed embodiments.

Object Comparison—Scaling

In certain circumstances, the similarity between an object to be rendered and a known managed object (apart from translation and rotation) may be a question as to a scale at which the objects are similar. For example, objects that have large scale-similarities, like a cork screw and a drill bit, may be different when viewed on a finer scale and/or resolution. Accordingly, in some embodiments, the comparison module 114 may further account for a scale and/or resolution at which an object to be rendered is similar to a known managed object (e.g., scale(s) in which objects are measured and/or addressed and/or scale(s) in which two compared objects are deemed to be similar).

In some embodiments, certain portions of an object to be rendered may require one scale of similarity relative to a known managed object to invoke policy enforcement, while other parts may require other scales of similarity. For example, a trademarked design of an ice pick handle may be compared at a relatively fine scale (e.g., based on the uniqueness and/or the proprietary nature of the handle), while other portions of the ice pick may be compared at a more coarse scale. In this manner, certain aspects or portions of known managed objects may be emphasized in connection with the disclosed object comparison methods.

Various object comparison methods can in combination, or by themselves, contribute to policy enforcement consistent with embodiments disclosed herein.

Object comparison may be performed and/or otherwise applied at various physical scales (e.g., length) and to different areas or volumes of the rendered object. For instance the material composition of a specially built propeller can have exposed surfaces composed of one material in layered combination with another material to prevent ablation, while the inside of the propeller can be made from a shock absorbing material. The precise combination of materials, layering of materials, spatial position of materials, may be the intellectual property of the inventor of the propeller and be managed according to policy using the disclosed systems and methods.

Policy Enforcement

Upon determining that an object to be rendered is the same or similar to a known managed object (e.g., based on a comparison between object rendering information 112 and managed object description information 116), the comparison module 114 may provide an indication of similarity between the objects to a policy module 118 executing on the control system 102. The policy module 118 may be configured to, among other things, enforce policy associated with the managed object in connection with rendering an object. In certain embodiments, the policy may be articulated in policy information included in the managed object description information 116 of the known managed object. In further embodiments, the policy may be identified and/or otherwise retrieved from the trusted authority 104 and/or another system maintaining policies associated with known managed objects.

A variety of policies may be associated with a known managed object and enforced by the policy module 118. In some embodiments, a policy may articulate certain restrictions, conditions, requirements, and/or other actions associated with rendering an object deemed similar to a known managed object with the 3D printing device 100. Policy information may articulate, without limitation, policies preventing and/or otherwise restricting the rendering of the object, policies articulating that certain conditions be met prior to rendering of the object (e.g., purchasing rights associated with the object, registration with a rights holder, demonstrating authorization to render the object, etc.), policies articulating that certain actions be performed in connection with rendering the object (e.g., notifying a rights holder, law enforcement, and/or governmental authorities, etc.), and/or the like. It will be appreciated that a variety of other types of policies may be associated with rendering an object deemed similar to a managed object, and that any type of policy articulating any restrictions, conditions, requirements, and/or actions to be enforced in connection with rendering the similar object may be utilized in connection with the disclosed embodiments.

Examples of policies that may be implemented in connection with the disclosed embodiments may include, without limitation, the following:

A requirement that a rights holder 122 or other entity receive payment prior to allowing rendering of an object deemed similar to a known managed object.

A requirement that a user provide proof of possessing a valid license before rendering of a firearm component similar to a known managed object or another hazardous object or substance.

A restriction on the rendering of a trademarked object associated with a brand without demonstrating permission from the trademark holder.

A restriction that a chemical reactor rendered by the 3D printing device 100 be constructed with limited capabilities (e.g., allowing a type of molecular chirality and/or disallowing another).

It will be appreciated that the foregoing are examples of possible policies, and that any suitable policies may be associated with known managed objects and enforced by the control system 102. In some embodiments, policies may be expressed and enforced using techniques described in the '693 patent; however, it will also be appreciated that any other suitable policy expression and enforcement framework could also be used in connection with the disclosed embodiments.

If restrictions, conditions, requirements, and/or other actions associated articulated in an enforced policy are satisfied, the policy module 118 may provide the control module 110 with an indication that the policy has been satisfied. Upon receiving the indication, the control module 110 may proceed with issuing instructions to the 3D printing device 100 for rendering the object. If the restrictions, conditions, requirements, and/or other actions articulated in the policy are not satisfied, however, the policy module 118 may provide the control module 110 with an indication that the policy has not been satisfied or, alternatively, provide no indication of policy compliance to the control module 100. Upon receipt of the indication or non-receipt of a policy compliance indication, the control module 110 may not issue control instructions to the 3D printing device 100, thereby preventing rendering of the object.

In certain embodiments, upon receipt of a policy compliance indication from the policy module 118, the control module 110 may issue control instructions to the 3D printing device 100 that may be, at least in part, different or otherwise modified from that articulated in the object rendering information 112 based on an associated enforced policy. For example, a policy associated with a managed object may articulate that unless a user of a 3D printing device 100 demonstrates possession of a license to render the object from a rights holder 122, the control module 110 may only issue instructions to the 3D printing device 100 to render the object if the control instructions cause an indication to be imprinted on the rendered object that the object is not licensed (e.g., "Unlicensed Product" or the like). In this way, enforced policy may modify how the control module 110 applies the object rendering information 112 in connection with issuing rendering instructions to the 3D printing device 100. It will be appreciated that the control module 110 may issue rendering instructions, not issue rendering instructions, and/or otherwise modify rendering issues in connection with policy enforcement and/or compliance processes, and that any type of action by the control module 110 in compliance with applicable policies may be implemented by the embodiments disclosed herein.

Trusted Boundaries and Encrypted Communication

In some embodiments, the 3D printing device 100, the feedback module 120, the control module 110, the comparison module 114, and/or the policy module 118 module, may be enclosed in a trusted boundary. In certain embodiments, the trusted boundary may comprise a trusted manufacturing boundary. In further embodiments, the trusted authority 104 and/or one or more other systems utilized in connection with the disclosed embodiments may also be included in a trusted boundary. In certain embodiments, including devices, modules, and/or systems in a trusted boundary may ensure integrity of the devices, modules, and/or systems and/or information communicated therebetween, thereby improving the ability of the disclosed embodiments to enforce policy associated with managed objects by reducing the potential for tampering and/or circumvention of certain policy enforcement controls. For example, in some embodiments, severing communication and/or modifying the flow of information between one or more modules and/or systems may render the 3D printing device 100 inoperable, thereby preventing the unauthorized rendering of known managed objects.

In some embodiments, information communicated between various devices, modules, and/or systems may be encrypted and/or otherwise cloaked to make it difficult to modify information flow therebetween in a subversive way. In certain embodiments, the various devices, modules, and/or systems may include cryptographic modules and/or submodules configured to enable cryptographic or otherwise secure communication therebetween.

In some embodiments, certain aspects of the trusted boundary may enforced by tamper resistance techniques. For example, portions of the various devices, modules, and/or systems could be rendered inoperable or severely degraded by the modification of their intended operation. Non-limiting examples of tamper resistance techniques include:

- Encasing and/or otherwise enclosing portions of the various devices, modules, and/or systems in a reactive substrate. For example, a head of a 3D printing device 100 may be manufactured such that components of the head are encased in a substance that releases chemicals that react with the components of the head when the substrate is breached.
- Encasing and/or otherwise enclosing portions of the various devices, modules, and/or systems in an impermeable substrate. For example, a head of a 3D printing device 100 may be manufactured such that components of the head are encased in a substance that has mechanical properties that resist removing the substrate without damaging the components.
- Fusing digital and mechanical components. For example, a head of a 3D printing device 100 can be manufactured to make the bypass of the control electronics difficult without damaging the electronics and/or head.

It will be appreciated that a number of variations can be made to the architecture and relationships presented in connection with FIG. 1 within the scope of the inventive body of work. For example, without limitation, in some embodiments, some or all of the functions performed by the 3D printing device 100 and/or the control system 102 may be performed by the trusted authority 104. Similarly, some or all of the functions performed by the trusted authority 104 may be performed by the 3D printing device 100 and/or the control system 102. Thus it will be appreciated that the architecture and relationships illustrated FIG. 1 are provided for purposes of illustration and explanation, and not limitation.

System Information Flow Example

Figure 2:
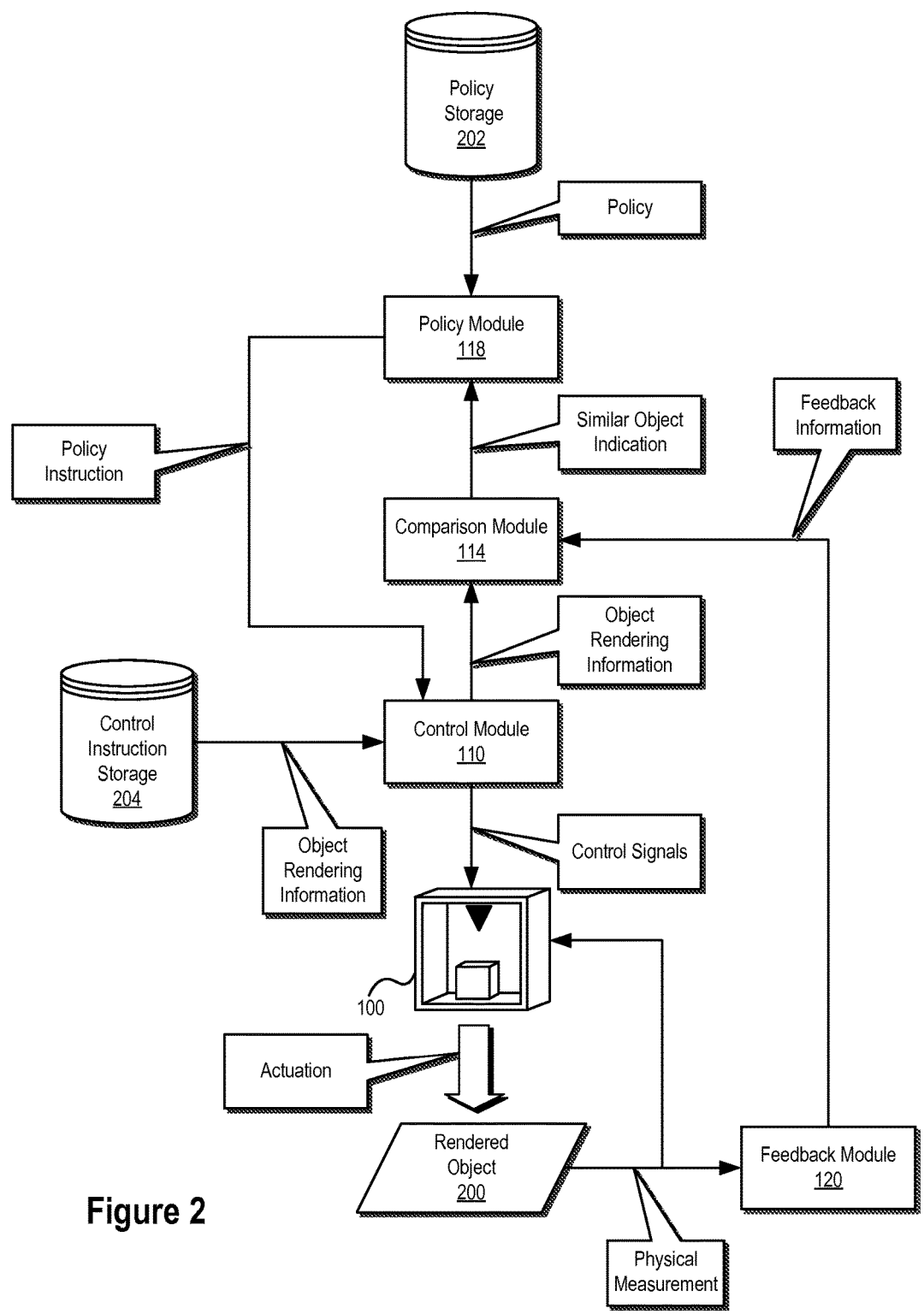
FIG. 2 illustrates a conceptual diagram of information flow between various functional modules associated with a 3D printing device consistent with embodiments of the present disclosure.

FIG. 2 illustrates a conceptual diagram of information flow between various functional modules 110, 114, 118, 120 associated with a 3D printing device 100 consistent with embodiments of the present disclosure. In certain embodiments, the various function modules 110, 114, 118, and 120 may be included in a control system associated with the 3D printing device 100. A user of a 3D printing device 100 may wish to render an object 200 using the device 100. As part of a request to render the object 200 from the user, object rendering information may be passed to the control module 110 from a storage 204 storing control instructions for rendering the object 200. In certain embodiments, the storage 204 may be associated with the requesting user. In further embodiments, the storage 204 may be associated with a system and/or library storing control instructions and/or other information for rendering a variety of objects.

Upon receipt of the object rendering information, the control module 110 may pass the rendering information to a comparison module 114. The comparison module 114 may perform various functions in connection with determining whether the object 200 is the same and/or similar to a known managed object consistent with embodiments disclosed herein. To determine whether the object is the same and/or similar to a known managed object, the comparison module 114 may compare the received object rendering information with information describing various known managed objects.

The comparison module 114 may provide an indication result of the comparison to a policy module 118. For example, the comparison module 114 may provide the policy module 118 with an indication that the object 200 is similar to a known managed object. In further embodiments, the indication may comprise a degree and/or manner in which the object 200 is similar to a known managed object.

Based on the indication, the policy module 118 may enforce one or more policies associated with a known managed objects. In certain embodiments, such policies may be retrieved from either a local or remote policy storage 202 storing a variety of policies associated with a variety known managed objects. If the received indication indicates the object 200 is not similar to a known managed object, the policy module 118 may determine that the object 200 is not policy-managed and provide an associated policy instruction to the control module 110 indicating that rendering of the object 200 may proceed without policy restriction. In response, the control module 110 may issue control signals to the 3D printing device 100 causing actuation of the 3D printing device 100 in connection with rendering the object 200.

If the indication received by the policy module 118 indicates the object 200 is similar to a known managed object, the policy module 118 may proceed to retrieve and enforce a policy associated with the known managed object in connection with rendering the object 200. The policy module 118 may issue one or more policy instructions to the control module 110 as part of a policy enforcement process. For example, the policy module 118 may provide policy instructions restricting the control module 110 from causing the 3D printer device 100 to render the object 200. Similarly, the policy module 118 may provide policy instructions indicating that requirements and/or conditions of an associated policy have been satisfied and that rendering of the object 200 may proceed. In yet a further example, the policy module 118 may provide policy instructions indicating that policy requires certain restrictions and/or modifications be enforced in connection with rendering the object 200, and the control module 100 may issue control instructions (e.g., modified instructions) to the 3D printing device 100 including such restrictions and/or modifications.

In certain embodiments, a feedback module 120 may receive one or more physical measurements relating to the rendered object 200. Such measurements may be received during and/or following rendering the object 200 by the 3D printing device 100. Such measurements may be further provided to the 3D printing device 100 and/or the control module 110 for use in connection with adjusting associated control instructions and/or device actuation so that the rendered object 200 more closely matches its intended physical properties. The feedback module 120 may further generate, based on the received physical measurements, feedback information provided to the comparison module 114. In certain embodiments, this feedback information may be utilized by the comparison module 114 and/or the policy module 118 to ensure that the object 200 is being rendered in accordance with any associated policies.

Figure 3:
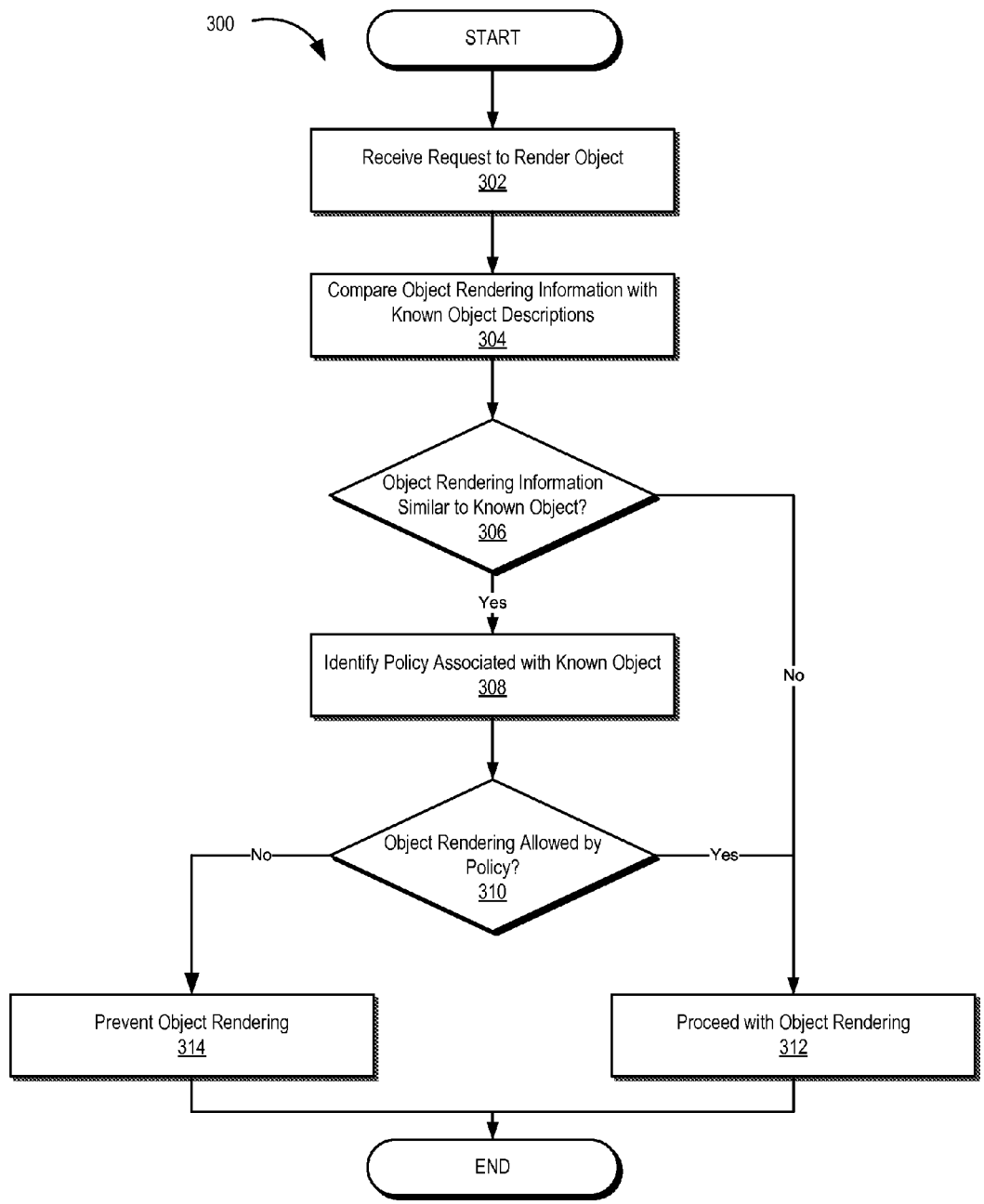
FIG. 3 illustrates a flow chart of a method for managing rendering of a managed object consistent with embodiments of the present disclosure.

FIG. 3 illustrates a flow chart of a method 300 for managing rendering of a managed object consistent with embodiments of the present disclosure. The illustrated method 300 may be implemented in a variety of ways, including using software, firmware, hardware, and/or any combination thereof. In certain embodiments, the method 300 may be implemented, at least in part, by a control module, a comparison module, and/or a policy module executing on a control system and/or a 3D printing device as described above.

At 302, a request to render an object using a 3D printing device may be received. In certain embodiments, the request may comprise object rendering information including information describing the object (e.g., physical measurements, properties, shapes, material composition, etc.) and/or certain steps and/or processes to be used by the 3D printing device in connection with rendering the object. A comparison may be performed at 304 based on the object rendering information associated with the object rendering request received at 302 and information associated with one or more known managed objects. In certain embodiments, the comparison may include comparing and/or otherwise analyzing an object's shape, material, composition, function, and/or the like as reflected in the object rendering information relative to information associated with one or more known managed objects.

Based on the comparison at 304, a determination may be made at 306 as to whether the requested object is the same or similar to one or more known managed objects. If the determination performed at 306 indicates the requested object is not the same or similar to a known managed object, rendering of the object by the 3D printing device may proceed at 312. If, however, it is determined at 306 that the requested object is the same or sufficiently similar to a known managed object, one or more articulated policies associated with the known managed object may be identified and/or enforced at 308.

At 310, a determination may be made as to whether rendering of the requested object is allowed by the policy identified at 308. In certain embodiments, such a determination may comprise determining whether one or more conditions for rendering the requested object have been satisfied (e.g., demonstrating possession of a license or the like). If the determination at 310 indicates that rendering of the requested object is allowed by the policy identified at 308, rendering of the object by the 3D printing device may proceed at 312. If, however, the determination at 310 indicates that rendering of the requested object is not allowed by the policy identified at 308, rendering of the object by the 3D printing device may be prevented at 314. In this manner, policy associated with known managed objects may be enforced in connection with attempts to render the same or similar objects by a 3D printing device.

In certain embodiments, the disclosed object comparison methods may be iterative in nature. For example, the comparison methods may utilize progressively more detailed and/or higher granularity and/or resolution comparisons until it can be determined with desirable confidence than an object and a known managed object are the same or similar or are not the same or similar to a particular degree. In certain embodiments, by utilizing iterative comparison methods at varying degrees of resolution and/or granularity, processing power and/or time required to perform such comparisons may be more efficiently utilized.

As an illustrative example, if a user were to attempt to render a golf ball, it could be determined at a relatively low resolution that the golf ball is not similar to a managed firearm object given the significant degree of difference between their shapes. If, however, a user were to attempt to render a blow dryer, when compared at a relatively low resolution, the blow dryer may have a similar shape to the managed firearm object. Accordingly, if it cannot be determined within a particular degree of confidence that the objects are similar or not similar at a particular resolution, the objects may be compared at a higher resolution. When analyzed at a higher resolution, the dissimilarity between the blow dryer and the managed firearm object may be more apparent. Accordingly, a determination may be made at a higher degree of confidence that the blow dryer is not similar to the managed firearm object. Although discussed in connection with shape comparison, it will be appreciated that similar iterative comparison techniques may be used in connection with comparing composition, function, techniques of manufacture, and/or any other technique for comparing an object and a known managed object disclosed herein.

Figure 4:
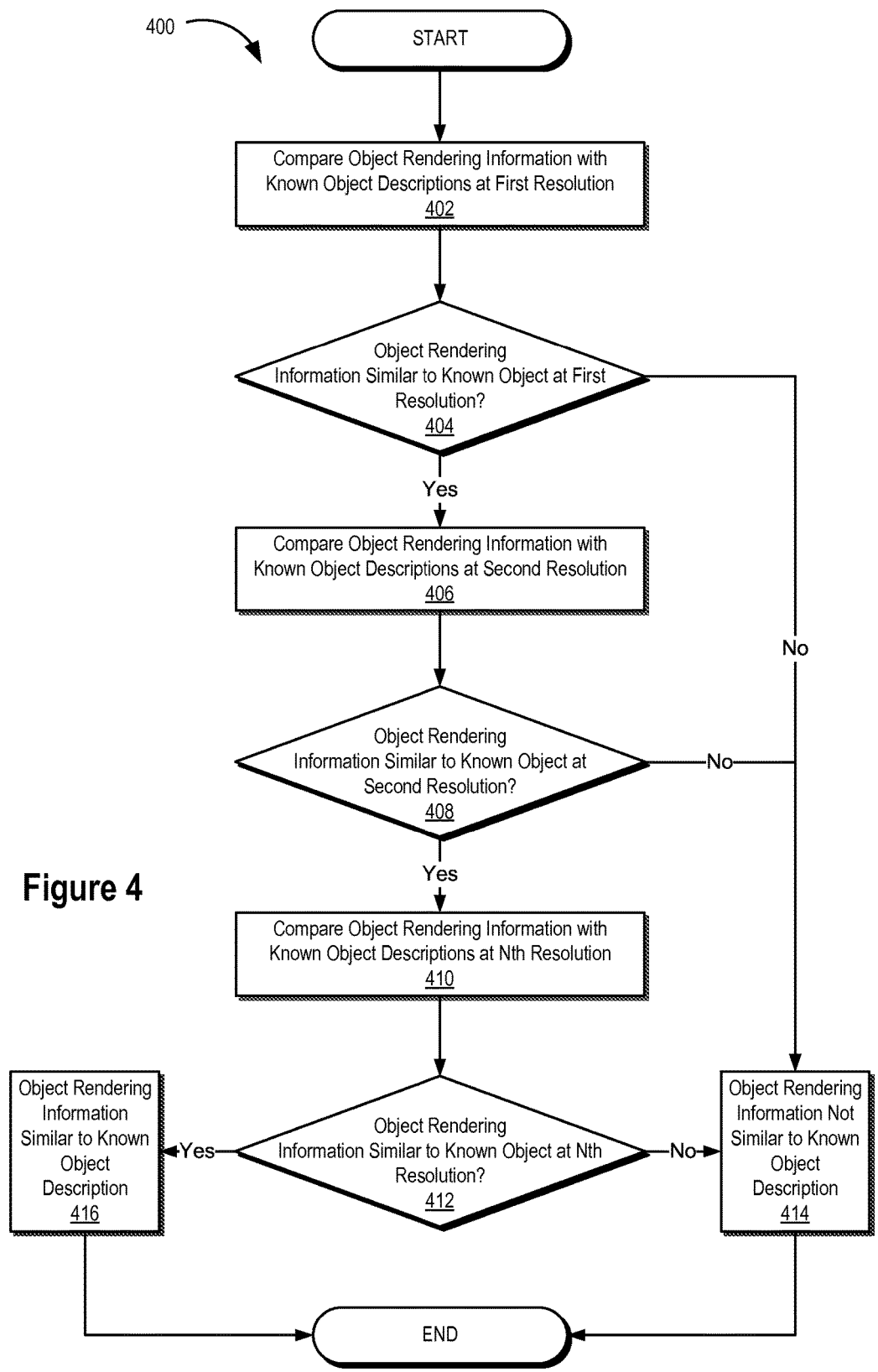
FIG. 4 illustrates a flow chart of an exemplary method for comparing an object with known managed objects consistent with embodiments of the present disclosure.

FIG. 4 illustrates a flow chart of an exemplary method 400 for comparing an object with known managed objects consistent with embodiments of the present disclosure. In certain embodiments, the illustrated method 400 may implement the iterative comparison techniques described above. At 402, object rendering information associated with an object a user would like to render may be compared with information associated with one or more known managed objects at a first resolution. In certain embodiments, the comparison may include comparing and/or otherwise analyzing an object's shape, material, composition, function, and/or the like as reflected in the object rendering information relative to information associated with one or more known managed objects. In some embodiments, the first resolution may be a relatively low and/or coarse resolution. In further embodiments, the first resolution may be a resolution at which two objects which are significantly different may be identified as dissimilar.

At 404, a determination may be made based on the comparison at 402 whether the requested object is similar to a known managed object at the first resolution (e.g., similar to a particular degree and/or within a particular degree of confidence). If it is determined at 404 that the objects are not similar at the first resolution, an indication that the objects are not similar may be generated at 414 and communicated to a control module associated with a 3D printing device. If it is determined at 404 that the objects are similar at the first resolution, the method may proceed to 406.

Although not specifically illustrated, in alternative embodiments, a determination may be made whether the first resolution is sufficient to identify whether the object is similar to a known managed object within a particular degree of confidence. If so, the method may proceed to 416 where an indication that the objects are similar may be generated and communicated to a control module associated with a 3D printing device. If not, the method may proceed to 406.

At 406, the object rendering information associated with the object the user would like to render may be compared with information associated with one or more known managed objects at a second resolution. In some embodiments, the second resolution may be higher and/or more granular than the first resolution. At 408, a determination may be made based on the comparison at 406 whether the requested object is similar to a known managed object at the second resolution. If it is determined at 408 that the objects are not similar at the second resolution, an indication that the objects are not similar may be generated at 414 and communicated to a control module associated with a 3D printing device. If it is determined at 408 that the objects are similar at the second resolution, the method may proceed to 410.

In alternative embodiments, although not specifically illustrated, a determination may be made whether the second resolution is sufficient to identify whether the object is similar to a known managed object within a particular degree of confidence. If so, the method may proceed to 416 where an indication that the objects are similar may be generated and communicated to a control module associated with a 3D printing device. If not, the method may proceed to 410.

At 410, the object rendering information associated with the object the user would like to render may be compared with information associated with one or more known managed objects at an nth resolution. In some embodiments, the nth resolution may be higher and/or more granular than the second resolution and be a resolution at which it may be determined whether an object is similar to a known managed object within a particular degree of confidence. At 412, a determination may be made based on the comparison at 410 whether the requested object is similar to a known managed object at the nth resolution. If it is determined at 412 that the objects are not similar at the nth resolution, an indication that the objects are not similar may be generated at 414 and communicated to a control module associated with a 3D printing device. If it is determined at 412 that the objects are similar at the nth resolution, indication that the objects are similar may be generated at 416 and communicated to a control module associated with a 3D printing device.

Example

Rendering a Patented or Trademarked Design

Embodiments of the present disclosure may be utilized in connection with protecting patented designs from being rendered by a 3D printing device without knowledge of a rights holder. For example, an individual may wish to start a small business selling a generic tablet computer with a back cover replaced with a back cover of a tablet computer from a prominent and well-regarded manufacturer. The individual may find it too cumbersome to form a business relationship with the manufacture and may decide it would be easier to produce back covers bearing the manufacturer's marks with a 3D printing device and included them on their products.

The individual may create object rendering information for rendering the back covers bearing the manufacturer's marks with the 3D printing device. Upon attempt to render a back cover, however, the individual may be presented with an indication that authorization from the manufacturer must be provided prior allowing the rendering to proceed. The indication may be a result of policy enforced by a control system associated with the 3D printing device that determined that the object rendering information for rendering the back covers is similar to a protected design and/or includes protected marks (e.g., known managed objects) owned by the manufacturer. Based on the indication, the individual may reconsider their plans.

Example

Rendering a Design Requiring Compliance with Standards

Further embodiments of the present disclosure may be utilized in connection with ensuring compliance with certain standards. In an illustrative example, an individual may discover they are one bolt short of completing construction of a helicopter. Governmental inspection standards for the helicopter may require that the bolt be manufactured and inspected in accordance with certain standards and bear markings indicating the same (e.g., a star).

To save money, the individual may wish to create a generic bolt with the necessary markings to pass inspections with a 3D printing device. The individual may create object rendering information associated with the same and attempt to render the bolt with the 3D printing device. Upon attempt to render the bolt, however, the individual may be presented with an indication on the 3D printing device and/or an associated control system that the bolt markings are protected and that the bolt may only be rendered if the markings are not included.

Example

Rendering an Illegal Design

Yet further embodiments of the present disclosure may be utilized in connection with preventing rendering of illegal designs by 3D printing devices. An individual may wish to render a unregistered semi-automatic firearm using a 3D printing device. The individual may create object rendering information for rendering the semi-automatic firearm with the 3D printing device. Upon attempt to render the firearm, however, the individual may be presented with an indication that authorization from an associated governmental authority must be provided before the rendering may proceed. The individual may further be presented with an indication that law enforcement authorities have been notified of their attempt to render the unregistered semi-automatic firearm. Based on the indications, the individual may reconsider their plans.

Example

Rendering a Reactor for Production of Controlled Substances

To avoid the steep charges of purchasing controlled substances, and to avoid overly intrusive inspection and regulation of Botulinum toxin, an individual may decide to produce their own. The individual may find rendering instructions to a bio-reactor on the Internet, complete with nutrient solutions, and tips on how to obtain the bacterium. The bio-reactor may be capable of being rendered by a 3D printing device.

The individual may download the rendering instructions, but may be unable to render the bio-reactor as it may be recognized as a potentially harmful device in its current configuration. Without producing appropriate credentials to proceed, the individual may not proceed with rendering the bio-reactor.

Example

Rendering of a 3D Printing Device without Policy Enforcement

To continue their dream of producing Botox, the individual from the above example may decide to render a 3D printing device that may operate without policy enforcement. After some research, the individual may create rendering instructions for a 3D printing device not subject to policy enforcement. When attempting to render the device with their current 3D printing, policy enforcement mechanisms may recognize the device as protected intellectual property and refuse to render the object.

System and Device Architecture

Figure 5:
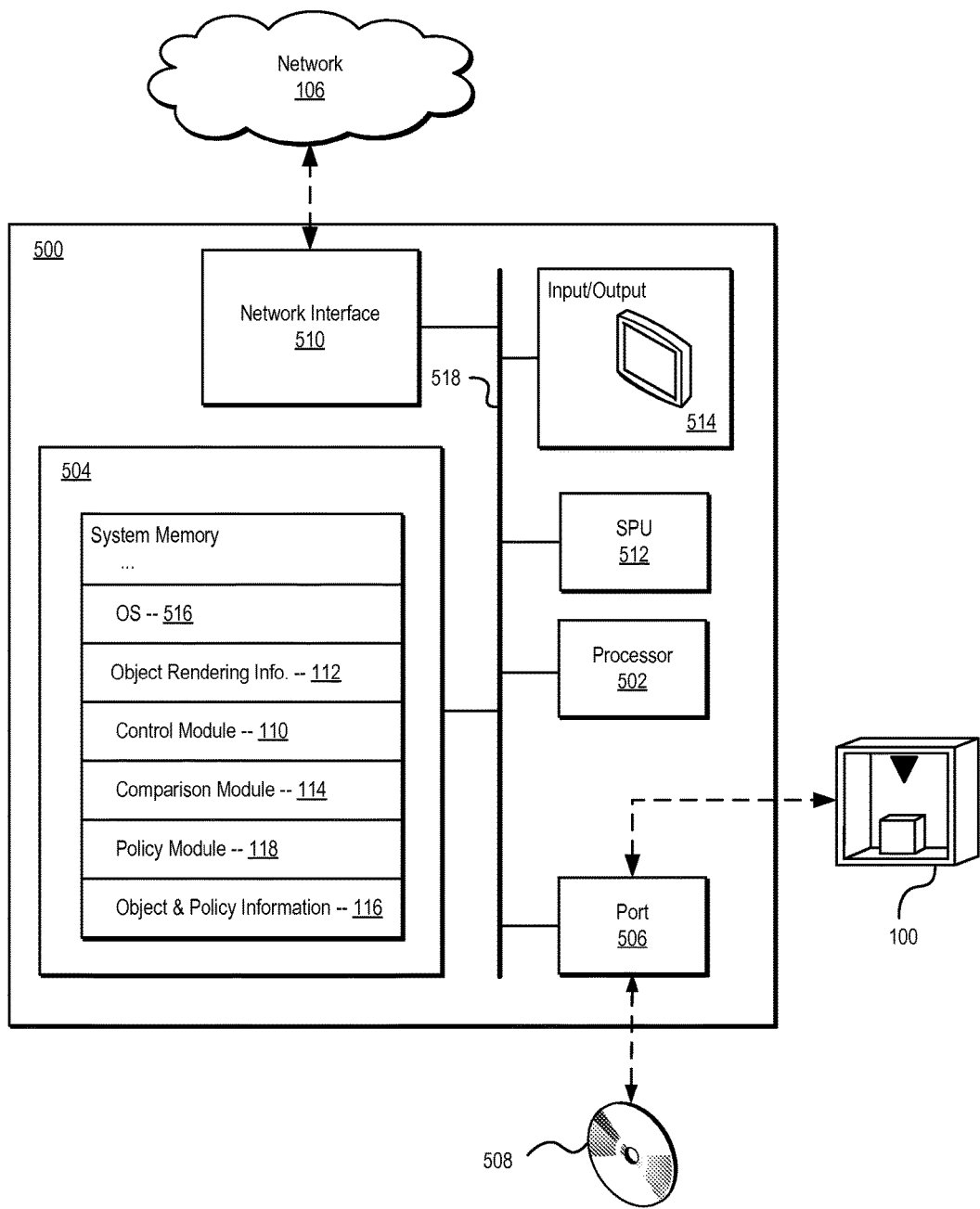
FIG. 5 illustrates a system that may be used to implement certain embodiments of the systems and methods of the present disclosure.

FIG. 5 illustrates a system 500 that may be used to implement certain embodiments of the systems and methods of the present disclosure. The system 500 may comprise a laptop computer system, a desktop computer system, a server computer system, and/or any other system or device configured to implement the systems and methods described herein. In certain embodiments, the system 500 may perform certain functions associated with a control system, a trusted authority, any/or any other system disclosed herein.

As illustrated in FIG. 5, system 500 may include: a processor 502; system memory 504, which may include high speed RAM, non-volatile memory and/or one or more bulk non-volatile computer-readable storage mediums (e.g., a hard disk, flash memory, etc.) for storing programs and other data for use and execution by the processor 502; an interface 514 (e.g., an input/output interface) that may include a display and/or one or more input devices such as, for example, a touchscreen, a keyboard, a mouse, a track pad, and the like; a port 506 for interfacing with removable memory 508 that may include one more diskettes, optical storage mediums, and/or other computer-readable storage mediums (e.g., flash memory, thumb drives, USB dongles, compact discs, DVDs, etc.) and/or a 3D printing device 100; a network interface 510 for communicating with other systems via a network 106 using one or more communication technologies; and one or more buses 518 for communicatively coupling the aforementioned elements.

In certain embodiments, network 106 may comprise the Internet, a local area network, a virtual private network, and/or any other communication network utilizing one or more electronic communication technologies and/or standards (e.g., Ethernet or the like). In some embodiments, the network interface 510 and/or network 106 may be part of a wireless carrier system, such as a PCS, and/or any other suitable communication system incorporating any suitable communication standards and/or protocols. In further embodiments, the network interface 510 and/or network 106 may be part of an analog mobile communications network and/or a digital mobile communications network utilizing, for example, CDMA, GSM, FDMA, and/or TDMA standards. In still further embodiments, the network interface 510 and/or network 106 may incorporate one or more satellite communication links and/or utilize IEEE's 802.11 standards, near-field communication, Bluetooth®, UWB, Zigbee®, and or any other suitable standard or standards.

In some embodiments, the system 500 may, alternatively or in addition, include a SPU 512 that is protected from tampering by a user of system 500 or other entities by utilizing secure physical and/or virtual security techniques. An SPU 512 can help enhance and/or facilitate the security of sensitive operations such as private management and/or enforcement of policies and/or other aspects of the systems and methods disclosed herein. In certain embodiments, the SPU 512 may operate in a logically secure processing domain and be configured to protect and operate on secret information. In some embodiments, the SPU 512 may include internal memory storing executable instructions or programs configured to enable to the SPU 512 to perform secure operations.

The operation of system 500 may be generally controlled by the processor 502 operating by executing software instructions and programs stored in the system memory 504 (and/or other computer-readable media, such as removable memory 508). The system memory 504 may store a variety of executable programs or modules for controlling the operation of the system 500.

For example, the system memory 504 may include an operating system ("OS") 516 that may manage and coordinate, at least in part, system hardware resources and provide for common services for execution of various. The system memory 504 may further include, without limitation, object rendering information 112, a control module 110 configured to provide control instructions to a coupled 3D printing device 100, a comparison module 114 configured to perform various object comparison methods disclosed herein, a policy module 118 configured to enforce policy associated with managed objects, and object and/or policy information 116 associated with managed objects, and/or any other information, modules, and/or applications configured to implement embodiments of the systems and methods disclosed herein.

One of ordinary skill in the art will appreciate that the systems and methods described herein can be practiced with computing devices similar or identical to that illustrated in FIG. 5, or with virtually any other suitable computing device, including computing devices that do not possess some of the components shown in FIG. 5 and/or computing devices that possess other components that are not shown. Thus it should be appreciated that FIG. 5 is provided for purposes of illustration and not limitation.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a Bernoulli drive, a magnetic disk, a punch card, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method performed by a system for controlling a 3-dimensional printing device comprising a processor and a non-transitory computer-readable storage medium storing instructions that, when executed, cause the system to perform the method, the method comprising:
   receiving a request to render an object with the 3-dimensional printing device;
   comparing information associated with the object with information associated with one or more managed objects at a plurality of resolutions, wherein comparing at one of the plurality of resolutions comprises comparing 3-dimensional shape information at the one of the plurality of resolutions associated with the object with 3-dimensional shape information at the one of the plurality of resolutions associated with the one or more managed objects;
   determining, based on the comparison, that the object is similar to at least one managed object of the one or more managed objects;
   identifying a policy associated with the at least one managed object; and
   enforcing the identified policy in connection with rendering the object with the 3-dimensional printing device.

2. The method of claim 1, the method further comprising comparing composition information associated with the object with composition information associated with the one or more managed objects.

3. The method of claim 1, the method further comprising comparing function information associated with the object with function information associated with the one or more managed objects.

4. The method of claim 1, the method further comprising comparing rendering step information associated with the object with rendering step information associated with the one or more managed objects.

5. The method of claim 1, wherein determining that the object is similar to the at least one managed object of the one or more managed objects further comprises:
   determining, based on the comparison, that the object is similar to the at least one managed object of the one or more managed objects by a particular degree of measure.

6. The method of claim 1, wherein the policy comprises one or more restrictions on rendering the object with the 3D printing devices.

7. The method of claim 1, wherein the policy comprises one or more conditions to be satisfied before rendering the object with the 3D printing device.

8. The method of claim 7, wherein the one or more conditions comprise a condition that an entity holding rights to the at least one managed object be notified of the request to render the object.

9. The method of claim 7, wherein the one or more conditions comprise a condition that a law enforcement agency be notified of the request to render the object.

10. The method of claim 7, wherein the one or more conditions comprise a condition that the user demonstrate possession of an indication of authority to render the object with the 3D printing device.

11. The method of claim 7, wherein the one or more conditions comprise a condition that the user purchase rights to render the object with the 3D printing device.

12. The method of claim 7, wherein the one or more conditions comprise a condition that a stakeholder entity associated with the at least one managed object be notified of the request to render the object.

13. The method of claim 1, wherein the policy comprises a requirement that the object be modified in connection with rendering the object with the 3-dimensional printing device.

14. The method of claim 13, wherein the modification comprises an inclusion of an indication that the object is not associated with a rights holder of the at least one managed object.

* * * * *